United States Patent Office.

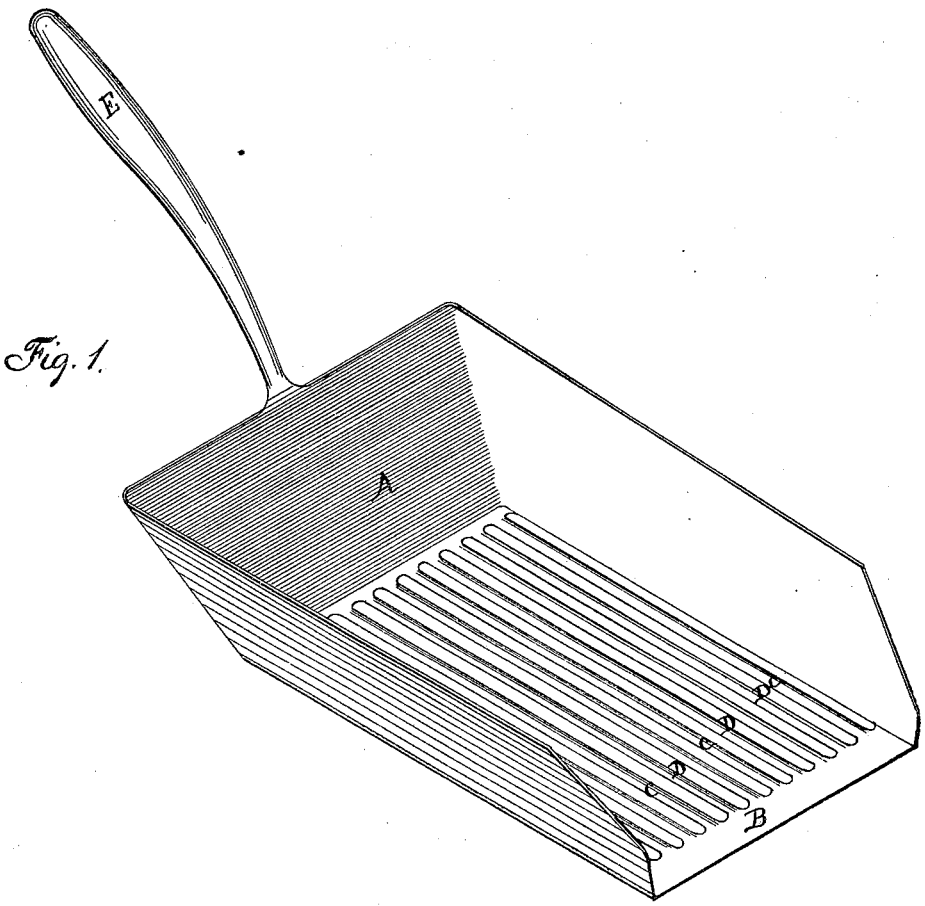
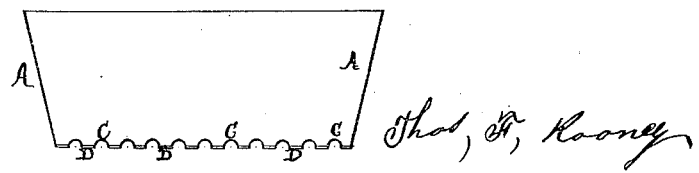

THOMAS F. ROONEY, OF CHICAGO, ILLINOIS.

Letters Patent No. 112,078, dated February 21, 1871.

IMPROVEMENT IN SIFTING-SHOVELS.

The Schedule referred to in these Letters Patent and making part of the same.

I, THOMAS F. ROONEY, of the city of Chicago, in the county of Cook and State of Illinois, have invented certain new and useful Improvements in Sifting-Shovels, of which the following is a full description, reference being had to the accompanying drawing making a part of this specification, in which—

Figure 1 is a perspective view, and
Figure 2, a cross-section.

Sifting-shovels have been heretofore made by casting the whole with bars along the bottom. When made in this mode they are heavy and inconvenient.

They have also been made of sheet metal, with an open space in the bottom, and with wires soldered or riveted across such opening; but when made in this way they are expensive, and the wires are liable to become lost or misplaced by reason of the thinness of sheet metal or by heat.

The nature of my invention consists in making the body and bars of the shovel of one piece of sheet metal by slitting the bottom, and stamping the strips into curved or semi-cylindrical form, so as to give them additional strength, and also to form the openings for the ashes to pass through.

To enable others skilled in the art to make and use my improved shovel, I will describe its construction and operation.

The body A of the shovel is made in the usual form, except that I prefer to make it deeper than they are usually made, as shown.

The bottom is cut into strips, leaving a portion, B, at the end entire, as shown. These strips are then stamped up by means of suitable dies into the form shown at C, leaving spaces D for the passage of the ashes.

Stamping the bars into a curved form gives great strength to them, and, being made from the same sheet of metal, there is no fastening at the ends to become loose or give away, thus making it as durable as similar shovels which are not made for sifting purposes, and stronger on the bottom.

The body of the shovel is also stamped up by means of suitable dies, and the same set of dies is made to form the shovel and the bars C.

The handle E may also be stamped from the same sheet of metal, and curved, to give it additional strength, or it may be made of a separate piece, or separate pieces, and attached to A by rivets or other suitable fastenings.

Having thus fully described my improved shovel, What I claim as new, and desire to secure by Letters Patent, is—

A shovel composed of a piece of sheet metal, having its body formed of a series of parallel bars, made by punching slits between them, and bending them transversely, substantially as described.

THOMAS F. ROONEY.

Witnesses:
L. L. BOND,
O. W. BOND.